United States Patent
Anand

(10) Patent No.: US 9,361,532 B2
(45) Date of Patent: *Jun. 7, 2016

(54) LABEL FOR ENABLING VERIFICATION OF AN OBJECT

(71) Applicant: LINKSMART TECHNOLOGIES PVT. LTD., Bangalore (IN)

(72) Inventor: Ashish Anand, Bangalore (IN)

(73) Assignee: LINKSMART TECHNOLOGIES PVT. LTD., Bangalore (IN)

(*) Notice: Subject to any disclaimer, the term of this patent is extended or adjusted under 35 U.S.C. 154(b) by 0 days.

This patent is subject to a terminal disclaimer.

(21) Appl. No.: 14/813,487

(22) Filed: Jul. 30, 2015

(65) Prior Publication Data

US 2015/0332109 A1    Nov. 19, 2015

Related U.S. Application Data

(63) Continuation of application No. 14/252,392, filed on Apr. 14, 2014, now Pat. No. 9,122,971, which is a continuation of application No. 13/590,871, filed on Aug. 21, 2012, now Pat. No. 8,740,076, which is a continuation-in-part of application No. 13/521,733, filed as application No. PCT/IB2011/050859 on Mar. 1, 2011.

(30) Foreign Application Priority Data

Mar. 10, 2010 (IN) .............................. 625/CHE/2010

(51) Int. Cl.
G06K 7/10 (2006.01)
G06K 7/14 (2006.01)
(Continued)

(52) U.S. Cl.
CPC ............... *G06K 9/2063* (2013.01); *G06K 7/10* (2013.01); *G06K 9/2027* (2013.01);
(Continued)

(58) Field of Classification Search
CPC ........... G06K 7/10; G06K 7/14; G06K 17/00; G06K 19/00; G06K 19/06; G06F 17/00
USPC .................................. 235/454, 494, 375, 487
See application file for complete search history.

(56) References Cited

U.S. PATENT DOCUMENTS 4,825,801 A   5/1989  Weber
5,346,259 A   9/1994  Mocilnikar et al.
(Continued)

FOREIGN PATENT DOCUMENTS

CN          1946608 A      4/2007
CN        101427138 A      5/2009
(Continued)

OTHER PUBLICATIONS

"X-Ray Labels," Lara Marketing, accessed at https://web.archive.org/web/20131202201902/http://www.laramarketing.co.uk/index.php?p=xray, accessed on Sep. 2, 2014, 1 page.
(Continued)

*Primary Examiner* — Edwyn Labaze
(74) *Attorney, Agent, or Firm* — Foley & Lardner LLP

(57) ABSTRACT

A label for enabling verification of an object includes a scannable region that enables determination of auto-acquired unique spatial orientation of the scannable region with respect to a reference thereby enabling determination of a spatial orientation of the label with respect to the reference. The label is applied onto the object and a change in the spatial orientation of the label indicates tampering of the label, thereby enabling verification of the object. Further, a method for detecting tampering of an object includes providing label on the object. The label has at least a portion which is scannable region with a plurality of patterns and is associated with an external reference point. Further, the method includes determining a first and a second spatial orientations of the label based on computation between the patterns and the reference point, and generating an alert on noticing a change between first and second spatial orientations.

19 Claims, 15 Drawing Sheets

(51) Int. Cl.

| | | |
|---|---|---|
| *G06K 9/20* | (2006.01) | |
| *G06K 9/62* | (2006.01) | |
| *G06K 19/06* | (2006.01) | |
| *G06K 19/067* | (2006.01) | |
| *G06K 19/07* | (2006.01) | |
| *G06K 19/10* | (2006.01) | |

(52) U.S. Cl.
CPC ........... *G06K 9/6201* (2013.01); *G06K 19/067* (2013.01); *G06K 19/06009* (2013.01); *G06K 19/0614* (2013.01); *G06K 19/07* (2013.01); *G06K 19/10* (2013.01); *G06K 2009/6213* (2013.01)

(56) References Cited

U.S. PATENT DOCUMENTS

| | | | |
|---|---|---|---|
| 6,975,765 | B2 | 12/2005 | McGrew et al. |
| 7,151,455 | B2 | 12/2006 | Lindsay et al. |
| 7,353,994 | B2 | 4/2008 | Farrall et al. |
| 7,770,013 | B2 | 8/2010 | Rhoads et al. |
| 7,856,116 | B2 | 12/2010 | Rodriguez et al. |
| 8,427,313 | B2 | 4/2013 | Nelson |
| 8,740,076 | B2 | 6/2014 | Anand |
| 2004/0101168 | A1 | 5/2004 | Kostrzewski et al. |
| 2004/0153649 | A1 | 8/2004 | Rhoads et al. |
| 2005/0230961 | A1 | 10/2005 | Walley |
| 2007/0081694 | A1 | 4/2007 | Ryan, Jr. |
| 2007/0119951 | A1 | 5/2007 | Auslander et al. |
| 2008/0004822 | A1 | 1/2008 | Nadabar et al. |
| 2009/0097647 | A1 | 4/2009 | Harris |
| 2009/0102179 | A1 | 4/2009 | Lo |
| 2009/0238468 | A1 | 9/2009 | Long |
| 2009/0309733 | A1 | 12/2009 | Moran et al. |
| 2010/0008545 | A1 | 1/2010 | Ueki et al. |
| 2010/0012713 | A1 | 1/2010 | Greene |
| 2010/0327060 | A1 | 12/2010 | Moran et al. |
| 2011/0102143 | A1 | 5/2011 | Rodriguez et al. |
| 2011/0260868 | A1 | 10/2011 | Fuchida |
| 2012/0280043 | A1 | 11/2012 | Roseman |

FOREIGN PATENT DOCUMENTS

| | | |
|---|---|---|
| CN | 101583865 A | 11/2009 |
| DE | 202005 020 646 | 7/2006 |
| JP | 2004-302351 | 10/2004 |
| JP | 2005-511352 | 4/2005 |
| JP | 2006-133360 | 5/2006 |
| JP | 2010-037075 | 2/2010 |
| JP | 2010-534827 | 11/2010 |
| WO | WO-03/056506 | 7/2003 |
| WO | WO-2009/015839 | 1/2009 |
| WO | WO-2010/079465 | 7/2010 |
| WO | WO-2011/110973 | 9/2011 |

OTHER PUBLICATIONS

"Machine Vision Systems," Keyence Corporation, accessed at https://web.archive.org/web/20110607182150/http://www.sensorcentral.com/vision/tech15.php, accessed on Sep. 2, 2014, pp. 1-2.

European Search Report with Written Opinion for EP No. 13164385.0 mailed on Nov. 28, 2013.

International Search Report for International Application No. PCT/IB2011/050859 mailed on Apr. 20, 2012.

Lara Marketing: "X-Ray Labels" URL:http://www.laramarketing.co.uk/index.php?p=xray, 2004, 1 page.

Diameter of two target circles detected = 4.5 mm and other circle diameter = 4 mm.

LABEL FOR ENABLING VERIFICATION OF AN OBJECT

CROSS-REFERENCE TO RELATED APPLICATIONS

This present application is a continuation under 35 U.S.C. §120 of U.S. patent application Ser. No. 14/252,392, filed on Apr. 14, 2014, now U.S. Pat. No. 9,122,971, which is a continuation under 35 U.S.C. §120 of U.S. patent application Ser. No. 13/590,871, filed on Aug. 21, 2012, now U.S. Pat. No. 8,740,076, which in turn is a continuation in part under 35 U.S.C. §120 of U.S. patent application Ser. No. 13/521,733, filed on Jul. 11, 2012, which in turn is a U.S. National Stage Application under 35 U.S.C. §371 of International Application No. PCT/IB2011/050859, filed on Mar. 1, 2011, which in turn claims the priority under 35 U.S.C. §119(a) of Indian Provisional Patent Application No. 625/CHE/2010, filed on Mar. 10, 2010. The entire contents of the foregoing applications are herein incorporated by reference in their entirety.

BACKGROUND OF THE INVENTION

The disclosed subject matter generally relates to the field of object identification labels, and more particularly but not exclusively, to enable content verification.

SUMMARY OF THE INVENTION

In various industries, objects and consignments are labelled to track, identify and verify genuineness of said objects and consignments. However, a plaguing problem relates to tampering and counterfeiting of such labels, which leads to substantial losses.

One of the common problems is that a person with malicious intent can remove a label affixed on an object. This label can be later affixed on a counterfeit object.

Another problem relates to malpractice committed by insiders who have access to genuine labels. In many scenarios, insiders steal genuine labels and facilitate application of the genuine labels on counterfeit objects.

Yet another problem relates to counterfeiting of labels, which is relatively easy in light of the currently available technologies.

The above cited problems, among many others, which can be referred to as malpractice, lead to substantial losses. Hence, conventional technologies have tried to address some of the aforementioned problems.

In one of the conventional approaches, labels with invisible images are affixed to objects. Presence of such images in the labels makes counterfeiting difficult. However, it has been found that, even such labels can be successfully counterfeited by using currently available technologies. Further disadvantage is that, this approach does not address the problem related to removal of affixed genuine labels on objects and thereafter, applying the label on counterfeit objects. Yet another disadvantage is that, this approach does not address the problem related to insiders stealing genuine labels and facilitating application of such genuine labels on counterfeit objects.

In another conventional approach, labels with random signatures are manufactured by doping resonators within plastic. A disadvantage associated with this approach is that, it does not address the problem related to removal of affixed genuine labels on objects and thereafter, applying the label on counterfeit objects. Yet another disadvantage is that, this approach does not address the problem related to insiders stealing genuine labels and facilitating application of such genuine labels on counterfeit objects.

Few more conventional technologies, which have similar disadvantages, include nano-fingerprinting, bubble-tag and radio frequency identification labels.

In light of the foregoing discussion, there is a need for a technique to address the problem associated with removal of genuine labels affixed on objects and applying of such labels on counterfeit objects. Further, the technique shall address the problem associated with insiders with access to genuine labels, who steal genuine labels and facilitate application of the genuine labels on counterfeit objects. Furthermore, the technique shall address the problem associated with counterfeiting of labels, among other problems.

BRIEF DESCRIPTION OF THE DRAWINGS

Embodiments are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION OF THE PREFERRED EMBODIMENTS

In the following description, numerous specific details such as implementations, types and interrelationships of system components, are set forth in order to provide a more thorough understanding of the present application. It will be appreciated, however, by one skilled in the art that the application may be practiced without such specific details. Various low level details which are not directly related to application or full instruction sequence have not been shown in detail in order not to obscure the application. Those of ordinary skill in the art, with the included descriptions, will be able to implement appropriate functionality without undue experimentation.

References III the specification to "embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure or characteristic in connection with other embodiments whether or not explicitly described.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Embodiments disclose techniques for enabling determination of tampering or counterfeiting of labels, thereby, facilitating verification of objects. Objects, for example, may include, electronic objects, documents, goods and containers used is packaging and shipping, among other such objects.

In one embodiment, verification of an object is enabled by applying a label to the object. Spatial orientation of the label is determined at a first location. Thereafter, at a second location, the spatial orientation of the label is again determined. The spatial orientation of the label determined at the first and second locations are compared. An existence of difference determined upon comparison indicates tampering or counterfeiting of the label, hence, enabling verification of the object.

Figure 11:
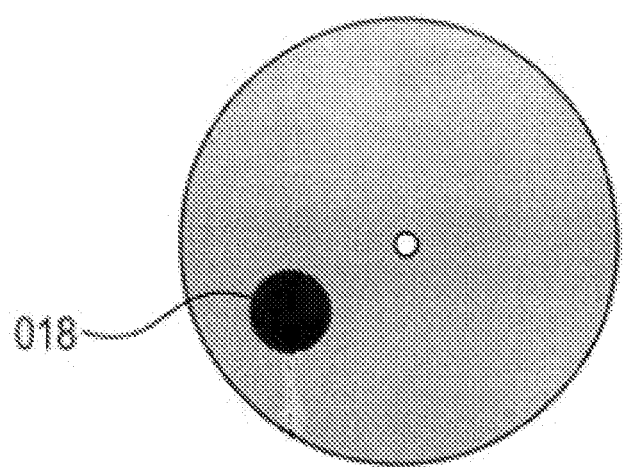
FIG. 11 illustrates a form of label, in accordance with an embodiment.

In an embodiment, the label includes a scannable region. Counterfeiting or tampering of labels is identified by determining spatial orientation of the scannable region of the label with respect to a reference. In an embodiment, the scannable region can be a radio opaque layer. The radio opaque layer may be distinctively scannable from rest of label. FIG. 11 illustrates a form of label, in accordance with an embodiment. In this label, both the label 018 and the scannable region are circular.

Figure 1:
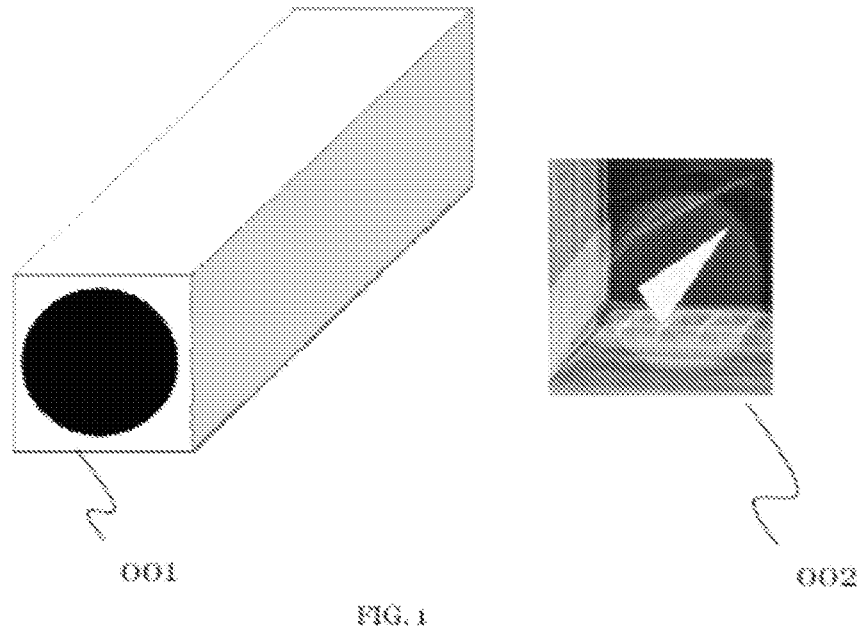
FIG. 1 illustrates a view 001 of the label as viewed by a naked eye and view 002 of the same label as viewed by a machine, in accordance with an embodiment.

In an embodiment, the scannable region may be invisible to a naked eye, while being capable of being scanned by a machine. FIG. 1 illustrates a view 001 of the label as viewed by a naked eye and view 002 of the same label as viewed by a machine. In this embodiment, the scannable region may be radio opaque.

In another embodiment, the scannable region is made invisible to naked eye by disposing the scannable region between layers of the label. Such an arrangement, can be referred to as sandwiching. The first layer having a first color, a second layer having a second color and the scannable region is disposed between the first layer and the second layer. The scannable region may have a color distinct from the colors of the first layer and the second layer.

As an example, in an exemplary embodiment, scannable region is black in color, while the layers between which the scannable region is sandwiched are of red and blue in color. Such a combination can make the scannable region visible under infra-red illumination. Similarly, skilled artisans shall appreciate that many other color combinations can be employed to make the scannable region invisible.

It may be noted that, the label may include more than two layers. Including more than two layers facilitates disguising the scannable region from naked eye.

Figure 15:
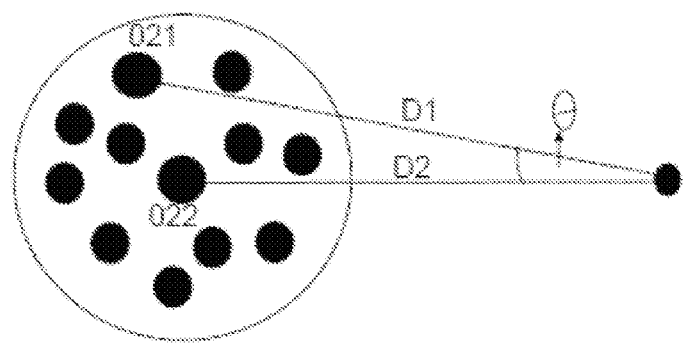
FIG. 15 illustrates scannable regions with varied dimensions within small range provided on the label, in accordance with an embodiment.

In another embodiment, the scannable region may be visible to a naked eye and also capable of being scanned by a machine. FIG. 15 illustrates a label, which includes scannable region visible to naked eye, in accordance with an embodiment. The label illustrated in FIG. 15 includes multiple visible geometric patterns of similar shape but of varying dimensions within small range. Including such pattern renders it difficult for a human eye to differentiate between them. However, machines can be configured to differential between the patterns and select appropriate pattern(s) to facilitate determination of spatial orientation of the label. In the example illustrated by FIG. 15, patterns 021 and 022 are considered for computing spatial orientation of label. In another form, patterns can be of same or varying size but in different colors and machine selects certain patterns of specific colors to compute spatial orientation of label and information about specific pattern selected is maintained for performing subsequent.

In an embodiment, a label can include scannable region, wherein some portion of the scannable region is visible to naked eye, while other portion of the scannable region is invisible to naked eye.

In an embodiment, label or scannable region within label, for example, may be delivered by using one or more of printing, punching, layering and optically variable device with dynamic color shift effect technologies, among other technologies.

In an embodiment, scannable region, for example, may include one or more of, geometric shapes, alpha-numeric character and symbols, among other shapes. The scannable region shall not be construed to be limited to any specific shape or dimension.

The label is configured to be applied to an object that may require verification. The labels can be applied to the object, for example, manually or by automatic applicator, or a combination of both.

The shape of the label may be such that, it makes it difficult to replicate the orientation. In an embodiment, the label, for example, can be circular. In case of a circular label, if the label is removed, it will be difficult to re-apply the same label or apply a different label in the same orientation as the previously applied label. In light of the foregoing discussion, skilled artisans shall appreciate that many other shapes may be employed for making it difficult to replicate the orientation. Such shapes shall be within the scope of the claims.

In an embodiment, a method for verifying objects is provided. The method employs application of the label to the object. The label when applied auto-acquires unique signatures, each time it is applied and re-applied on the object. The auto-acquiring of unique signature can mean generating a unique signature based on the spatial orientation of the scannable region of the label with respect to a reference associated with the object. Further, the label will auto-lose its unique signature, when removed from the object and thus cannot be scanned in isolation. Auto-loosing of unique signature could mean, even when the same label is reapplied or replaced by a different label, the previously auto-acquired unique signature cannot be replicated. The replication may not be possible, as the orientation of the scannable region of the reapplied label would be different from the orientation of the scannable region, when applied initially.

It shall be noted that, the scannable region may be illustrated as straight line, triangles or circles, but is not limited to shapes that are illustrated, as the same can be manufactured in different shapes. The methodology of application of labels to (inside or outside) the objects may depend on customized requirements of specific deployments.

In an embodiment, X-ray and computed tomography technologies can be applied to determine spatial orientation of the scannable region with respect to a reference. It shall be noted that, alternative technologies may also be leveraged, within the scope of the claims, to determine the same.

Figure 17:
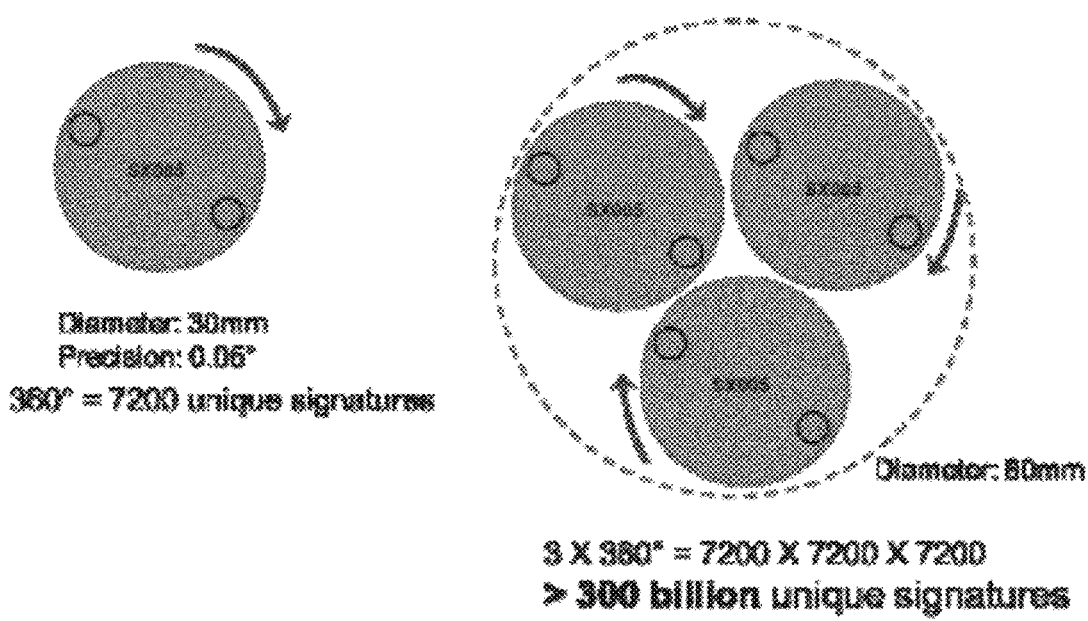
FIG. 17 illustrates 3 labels applied to an object, in accordance with an embodiment.

In an embodiment, more than one label can be applied to the object. Each of the labels can act as the reference to the other. It may be noted that, using multiple labels can generate substantial number of unique combination at a given precision of spatial orientation measurement. FIG. 17 illustrates 3 labels applied to an object, in accordance with an embodiment. Considering 0.05 degree precision of spatial orientation measurement, three adjacent label arrangement generates more than 300 billion unique combinations.

In an embodiment, two concentric labels can be used, wherein one of the labels has scannable region for which spatial orientation is computed with respect to the other label, which has a reference point or reference axis.

Figure 9:
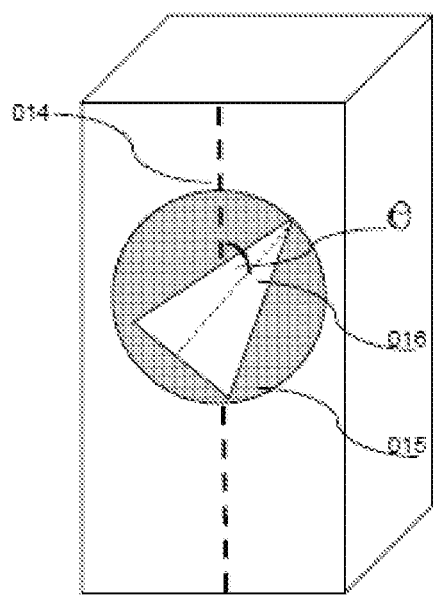
FIG. 9 illustrates a label applied on the opening edge of an object, in accordance with an embodiment.

In an embodiment, a distinctively recognisable portion of the object, such as an opening edge or corner of the object, is considered as the reference for determining the spatial orientation of the label. FIG. 9 illustrates a label applied on the opening edge of an object, in accordance with an embodiment. In FIG. 9, scannable region 016 is of triangular shape. The scannable region in this embodiment is made invisible to a naked eye, wherein the scannable region is imprinted on layer 015 of the label, which is not exposed to the outer world. The label is applied to the opening edge 014 of the object. The spatial orientation is computed with respect to the opening edge 014.

In an embodiment, an unique signature can be generated by using spatial orientation of the label and unique identification data associated with the object on which the label is applied.

Figure 10:
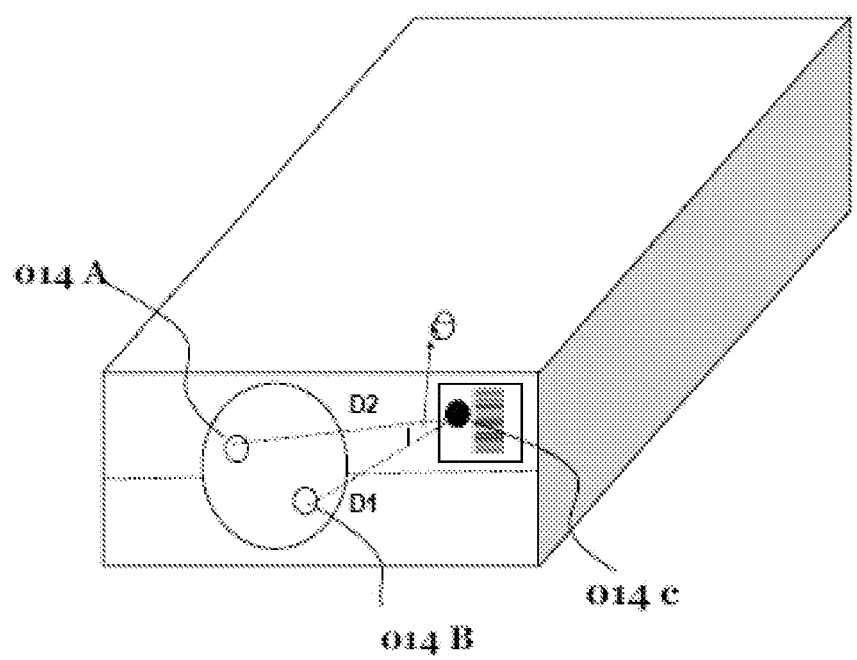
FIG. 10 illustrates a label applied to an object that includes a tag which comprises unique identification data corresponding to the object, in accordance with an embodiment.

FIG. 10 illustrates a label applied to an object that includes a tag which comprises unique identification data corresponding to the object, in accordance with an embodiment. Spatial orientation of the label is computed by measuring angle and distance of the scannable region 014A and 014B with respect to the reference 014C. The reference in this case is provided on the tag. In an embodiment, spatial orientation is computed at a location and the same may be stored in a database in association with the unique identification data. Subsequently, spatial orientation is again computed at a second location and is compared with data in the database, wherein the unique identification data is used as a reference to lookup data in the database.

Some of the embodiments enable imaging of the label in a direction agnostic manner, thereby eliminating the need to orient the item to be imaged, imaging device or label in a specific direction.

In an embodiment, the measured spatial orientation of the label is converted and encrypted to human readable string and uploaded on a monitoring portal tagged with unique identification data, date and time of scan. During uploading of credential, it is recommended that a secured network is used and scanner authenticates itself by way of digital certificate to the monitoring portal.

Figure 16:
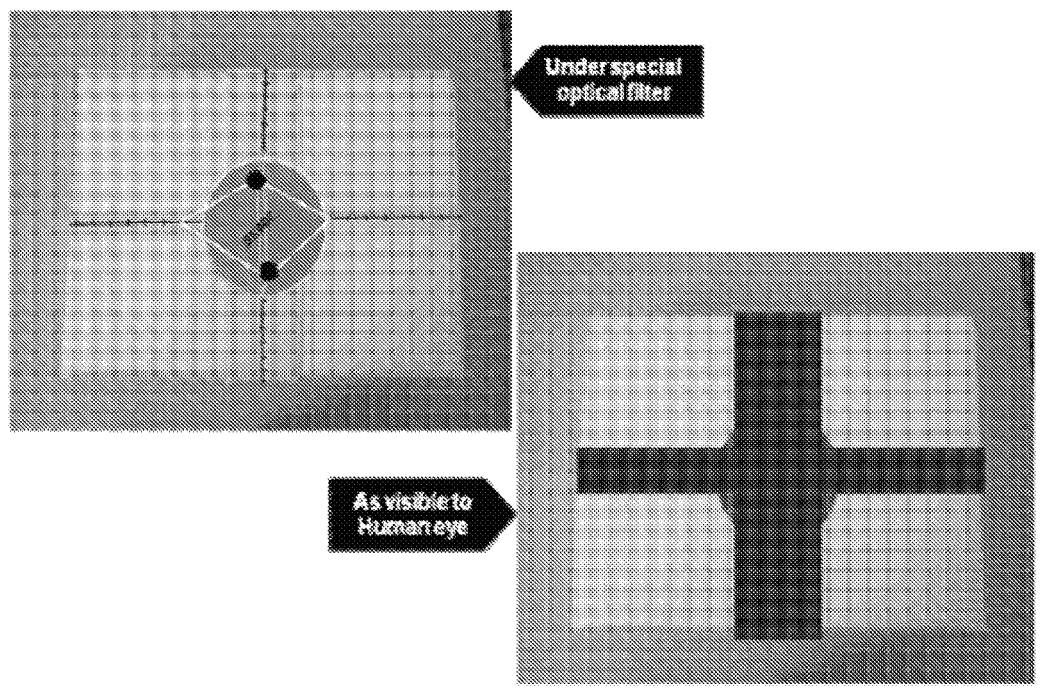
FIG. 16a illustrates label used along with elastic strapping on consignment, wherein the elastic strapping includes pre-printed scannable reference markings, in accordance with an embodiment.
FIG. 16b illustrates change III spatial orientation when a consignment illustrated in FIG. 16a is tampered, in accordance with an embodiment.
Figure 16:
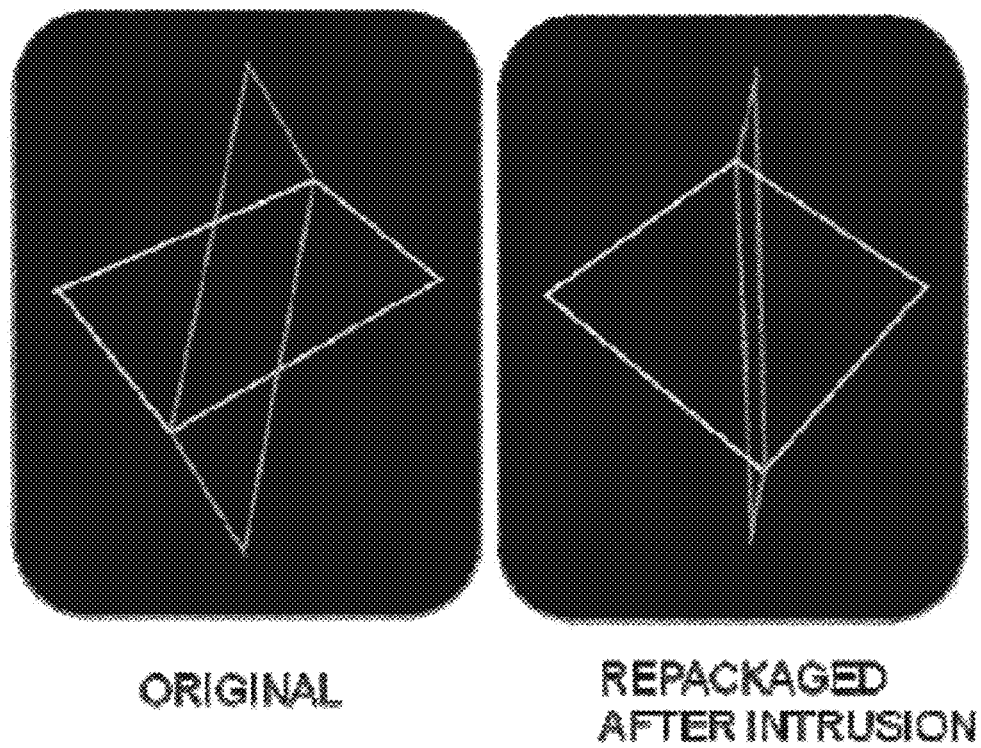

In one embodiment, 360 degree verification of content using single scan is provided. In this embodiment, the object can be strapped using an elastic band. FIG. 16*a* illustrates an object being strapped using an elastic band, in accordance with an embodiment. The elastic band has pre-printed scannable reference markings. These reference markings along with spatial orientation of label forms 360 degree tamper detection credential as shown in FIG. 16*b*, to detect repackaging of box after intrusion from one or more sides or edges of the object. In an exemplary embodiment, the elastic band may be colored deep red with scannable reference markings in black and laminated by deep blue color semi transparent tape. Other color combinations are understood by those skilled in the art.

Figure 14:
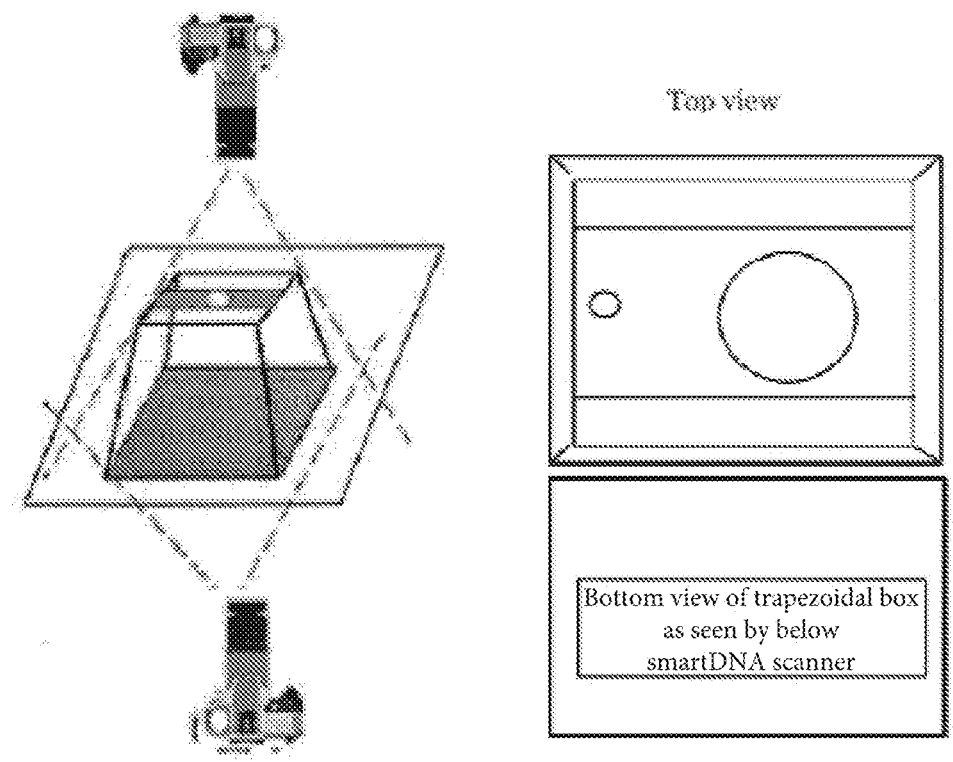
FIG. 14 illustrates two machine vision system to monitor top and bottom view and detect intrusion through sides or edges of a consignment, in accordance with an embodiment.

In an embodiment, 360 degree verification of content is provided without using elastic band. In this embodiment, the consignment can be of trapezoidal shape. Two machine vision system in one single scan can monitor top and bottom view to detect any cut and hence any intrusion through sides or edges as shown in FIG. 14. Further if two machine vision systems are not to be used, then one single machine vision system can monitor one side on which label is applied, and another sides of the trapezoidal consignment are scanned in its mirror view, provided box is stationed on platform with capability to project mirror view of one side to machine vision system.

In one embodiment, to provide enhanced security, the label can be punched. The label may be punched in an area other than the scannable region. The label may be punched prior to application on the object. This increase the security against tampering. The increased security is due to the fact that, even if a person replicates spatial orientation of the label, it may be hard to replicate the exact punch location in the label.

In an embodiment, multiple scannable regions with varied dimensions within narrow range are provided on the label. Such scannable regions with varied dimensions increase the level of security against tampering even without invisible patterns. Embedded software is provided in machine vision system to select one or more scannable regions of specific dimension to compute angle and distance with respect to a reference. It may be noted that an intruder would not know which of the scannable regions are selected to compute, thereby enhancing security against tampering. In an embodiment, while uploading credentials, this additional data is also recorded for use in subsequent authentication for tamper-detection. FIG. 15 illustrates scannable regions with varied dimensions within narrow range provided on the label, in accordance with an embodiment. Provision of such scannable regions makes it illusionary to human eye, thereby enhancing security. Scanners can detect target scannable regions 021 and 022, and can measure precise dimensions, considered for computing spatial orientation of label. Such enhancements make labels extremely secured from any insider threat.

Figure 18:
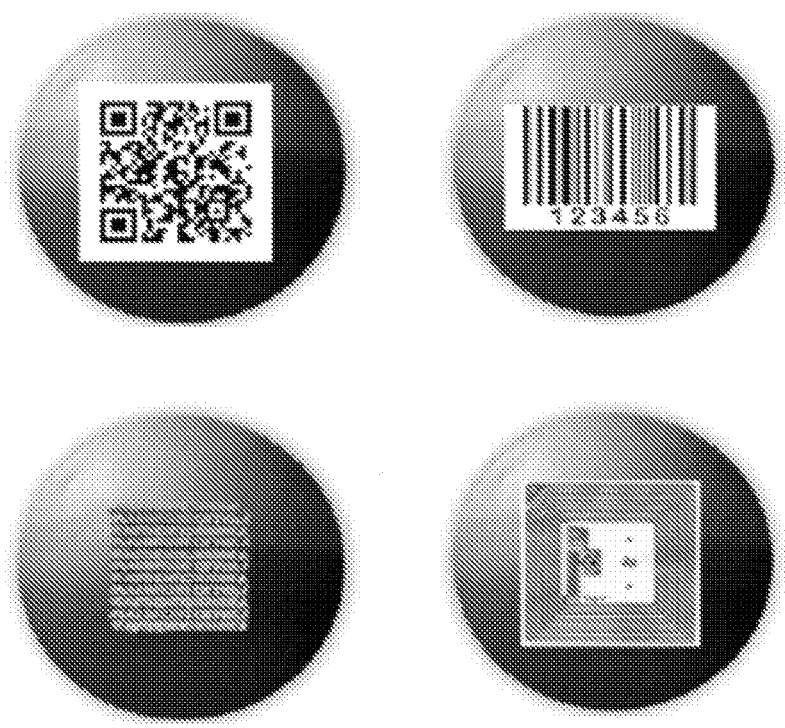
FIG. 18 illustrates labels used along with known tracking and anticounterfeit technologies, in accordance with various embodiments.

In an embodiment, label is unified with tracking technologies. Example of tracking technologies includes radio frequency identification tag, magnetic stripe tag, barcode and QR-code, among others. Unifying label with tracking technologies enable verification of tampering or counterfeiting of such technologies, based on spatial orientation. FIG. 18 illustrates labels used along with known tracking and anticounterfeit technologies, in accordance with various embodiments.

In an embodiment, a method of verifying content in a consignment is provided. The method includes associating a unique identification tag for a consignment, wherein the consignment houses multiple objects. At least one label is applied to each object housed in the consignment. At a first location, at least one image of the consignment is captured. The image may be captured based on multiple predetermined parameters selected with respect to the unique identification tag. Subsequently, at a second location, at least one image of the consignment is again captured based on multiple predetermined parameters selected with respect to the unique identification tag. The images captured at the two locations are used to determine a relative spatial orientation index. The relative spatial orientation index being representative of the collective spatial orientation of each of the objects in the consignment; and generating an alert upon detecting the difference in spatial orientation between the two images.

Figure 2:
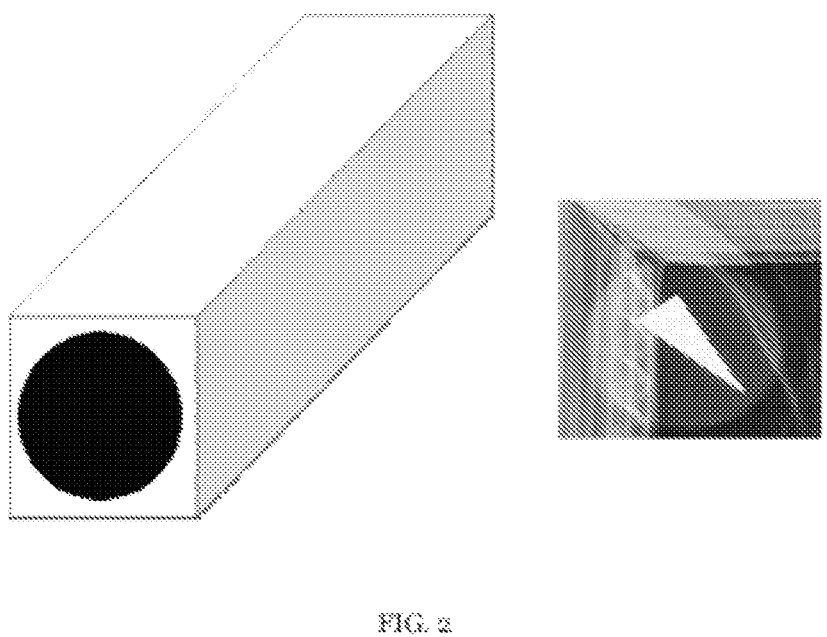
FIG. 2 illustrates a view of the label as viewed by a naked eye and view of the same label as viewed by a machine in accordance with an embodiment.

FIG. 1 illustrates a view 001 of the label as viewed by a naked eye and view 002 of the same label as viewed by a machine. Similarly, FIG. 2 illustrates a view of the label as viewed by a naked eye and view of the same label as viewed by a machine. Comparison between the two figures shows that the label has been tampered, as can be seen in machine view, while the location of the label appears to be the same to a naked eye.

Figure 3:
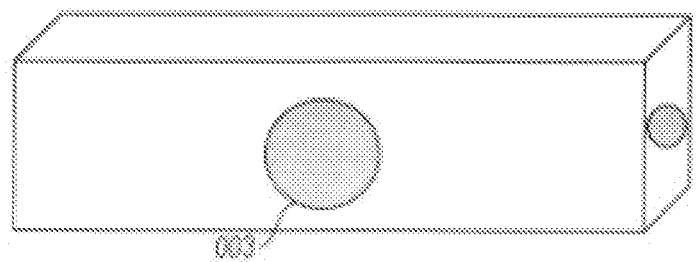
FIG. 3 illustrates two labels applied to the consignment, as viewed by naked eye, in accordance with an embodiment.
Figure 4A:
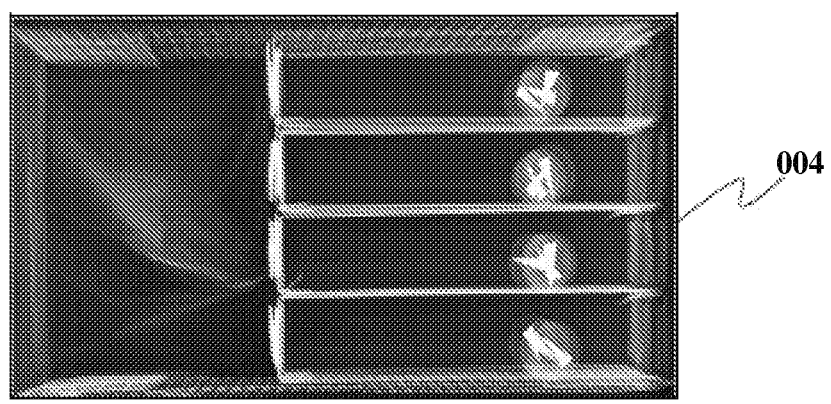
FIGS. 4a and 4b illustrate images of the consignment taken by a machine at a first location, in accordance with an embodiment.
Figure 4B:
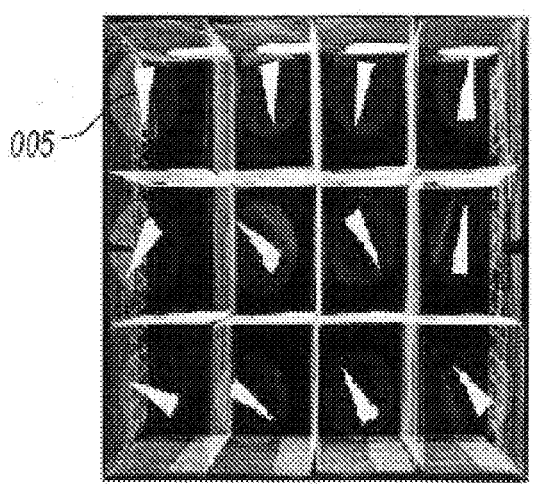
Figure 5A:
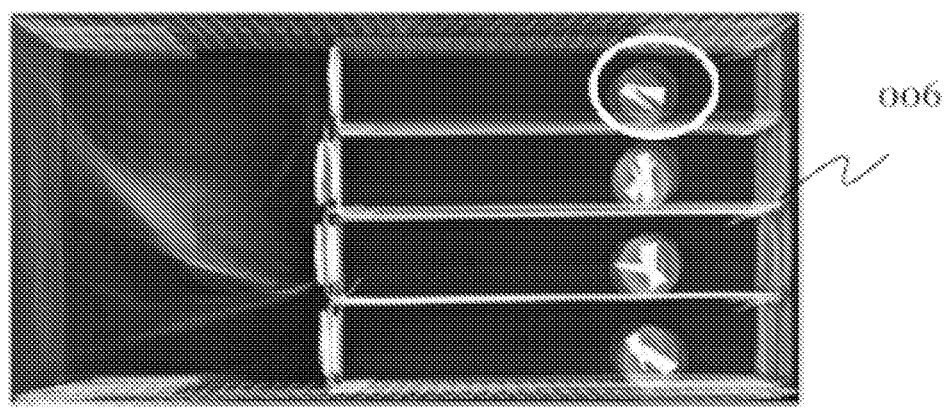
FIGS. 5a and 5b illustrate images of the consignment taken by a machine at a second location, in accordance with an embodiment.
Figure 5B:
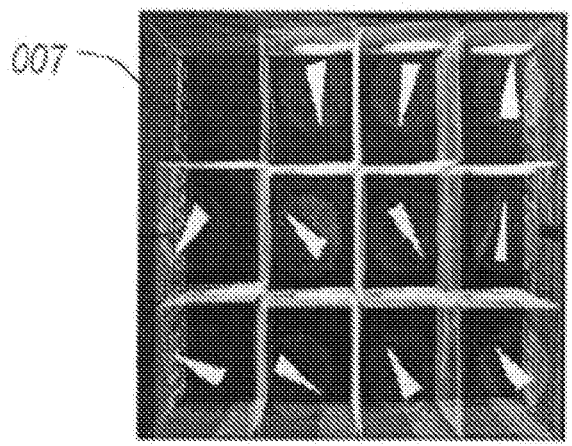

In another example, FIGS. 3, 4a, 4b, 5a, 5b illustrate verification of objects within a consignment. FIG. 3 illustrates two labels (e.g., 003) applied to the consignment, as viewed by naked eye. It shall be noted that, apart from applying labels to the consignment, a label is applied to each object housed in the consignment. FIGS. 4a and 4b illustrate images 004 and 005 of the consignment taken by a machine at a first location. It shall be noted that the images illustrated are those of the scannable regions of the labels applied to the objects. For sake of simplicity, the images of the scannable regions of the labels applied to the consignment are not illustrated in FIGS. 4a, 4b, 5a and 5b. FIGS. 5a and 5b illustrate images 006 and 007 of the consignment taken by a machine at a second location. Comparison between images captured at the two locations indicates a missing object. Hence, it may be noted that, apart from detecting tampering or counterfeiting of labels, the labels can also be used for counting the objects.

Figure 6A:
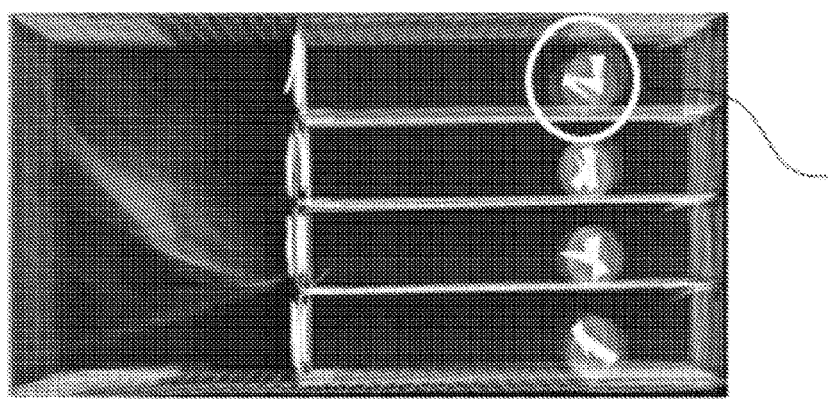
FIGS. 6a and 6b illustrate images of a consignment taken by a machine at a first location and second location, respectively, in accordance with an embodiment.
Figure 6B:
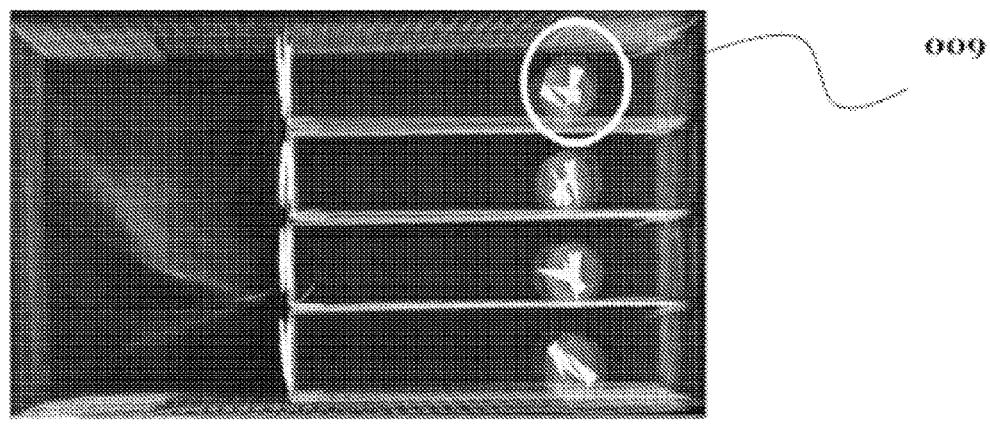

Another example is illustrated using FIGS. 6a and 6b. FIG. 6a illustrates an image 008 of the consignment taken by a machine at a first location. Similarly, FIG. 6b illustrates an image 009 of the consignment taken by a machine at a second location. The consignment houses multiple objects with a label attached to each object. Comparison between the images captured at both the locations indicates change in orientation of one of the labels, thereby indicating tampering.

Figure 12:
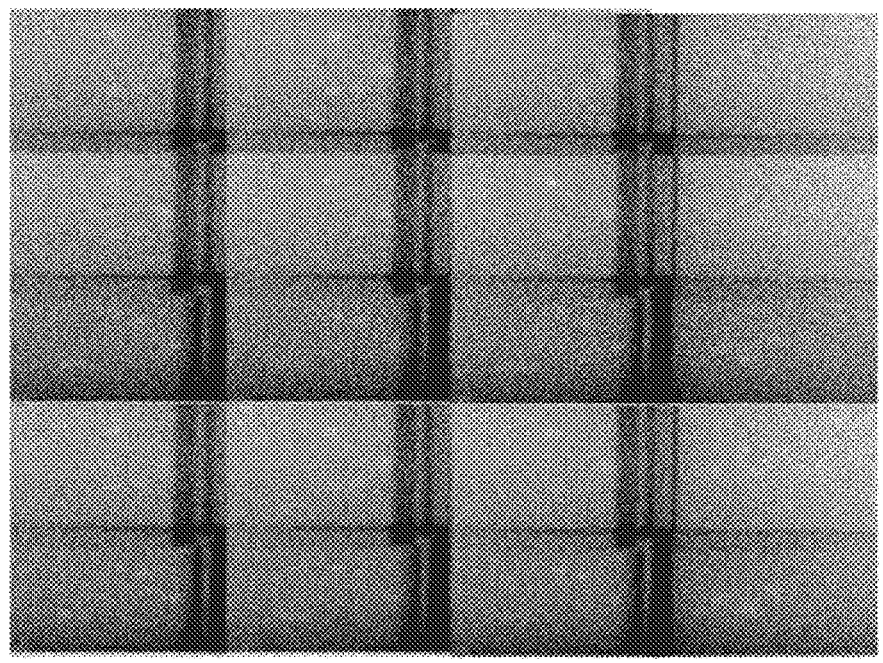
FIG. 12 illustrates captured image of labels applied to currency bundles that are housed in a currency box, in accordance with an embodiment.

In an embodiment, labels may be applied to currency bundles to check tampering. FIG. 12 illustrates captured image of labels applied to currency bundles that are housed in a currency box, in accordance with an embodiment. To a naked eye, all labels applied to the bundles appear to be the same. However, upon application, orientation of the scannable region of the labels is determined. Even if same label is re-applied at the same location on the bundle, the spatial orientation of the label (scannable region) will not be the same. Hence, tampering can be detected.

In an exemplary embodiment, the labels may be circular in shape. The diameter of the label may be greater than the diameter of the scannable region. These labels may be applied on the objects at a designated place. The image of the label that is closest to the imaging capture device (for example flat panel detector in X-ray machine) will be larger. The variation in the size of the images of the labels indicates the variation in the number of the items.

Figure 7A:
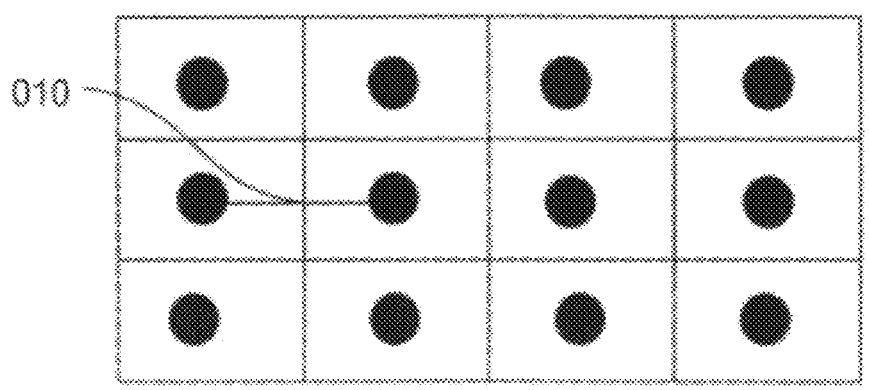
FIGS. 7a and 7b illustrate difference between images taken at different locations, in accordance with an embodiment.
Figure 7B:
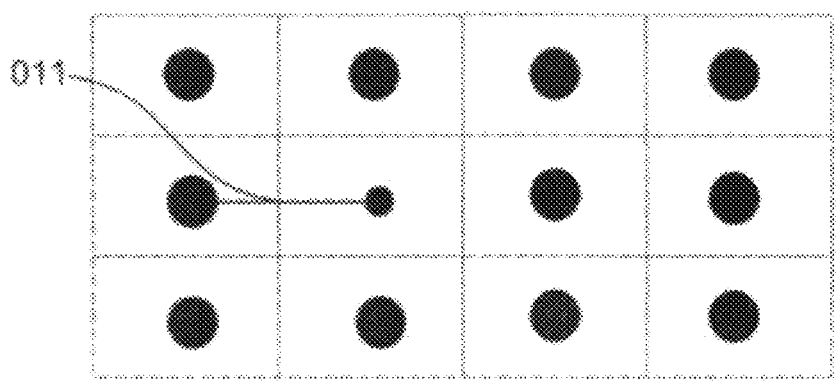

FIGS. 7a and 7b illustrate difference between images taken at different locations, in accordance with an embodiment. FIG. 7a illustrates an image taken at a first location. In this embodiment, a label 010 is applied to each of the objects at a predefined location on the object. Subsequently, the objects are stacked in rows and columns within a consignment. Further, an image of the consignment is captured, preferable from top view. The image of the labels 010 and 011 facing the imaging device is captured. It shall be noted that size of each label within the image depends on the distance of the label from the imaging device. To detect tampering, an image of the consignment is captured at a second location. This image is illustrated in FIG. 7b. As seen in the figures, there is a difference in size of the label (compare 010 and a11) captured at different locations. This difference is a result of one or more objects missing from the consignment, because of which, a label facing the imaging device is moved further down.

The above embodiment, may use a flat panel detector x-ray imaging machine. Further, the above embodiment may be suitable when all items within the consignment are of standard size and shape.

In an embodiment, more than one label can be applied on each item to effectively rule out possibility of exact overlapping of the images, by combining mathematical probability with multiple labels.

In an embodiment, a method of acquiring the reference images comprises acquiring a first reference image using a first set of predetermined parameters and acquiring a second reference image using a second set of predetermined parameters. The predetermined parameters may include angle and location of an imaging device with respect to the object tagged with label.

Further, the test images are acquired using the same set of predetermined parameters that are used for acquiring reference images. Therefore, the method of acquiring the test images comprises acquiring a first test image using the first set of predetermined parameters and acquiring a second test image using the second set of predetermined parameters.

One or more reference images are acquired at a first position of the consignment. Multiple reference images can be taken from multiple sides of the consignment, such that, overlapped orientation (FIG. 4a) and individual orientation (FIG. 4b) are received. The reference image shows overlapped imaging of randomly orientated radio-opaque layers from different labels associated with multiple objects stacked in the consignment. Reference image indexed with unique-ID of the consignment is sent to central server for storage or further processing.

During reference imaging, each consignment is tagged with a randomly generated unique identification data which is applied on the consignment, preferably, on the same side on which the reference image has been taken. Unique reference image of each consignment is digitally signed and during comparison, reference image is fetched indexed with unique-Id of consignment. Subsequent, imaging may be taken from same side on which the reference image was taken. For added protection of network channel fetching reference image can be crypto-protected using known protocols like IPSEC (IP Security/SSL (Secured Socket Layer).

The method further comprises obtaining at least one image capturing parameter associated with each of the reference and the test image, the image capturing parameter being associated with acquisition environment of the image. The image capturing parameter comprises one of the predetermined parameter, a location and at least one temporal parameter associated with image acquisition.

Subsequent to obtaining the image capturing parameter, the method comprises associating the relative spatial orientation index with the unique identification tag and the image capturing parameter for generating an image data and transmitting the image data to a monitoring unit. The monitoring unit may comprise one of a web server, a storage unit and a computational unit.

In an embodiment, each of the reference image and the test image may be normalized prior to comparison. For this purpose, each of the reference image and the test image can be subtracted with image of standard empty consignments prior to being compared, as wooden or corrugated packaging may include metallic parts such as nails that are radio opaque as well.

Image normalization further includes neutralizing the effects caused by varied (horizontal and vertical) motions of the objects within the consignment during transit. Full image of consignment is cropped in multiple portions length-wise and height-wise wherein, each cropped portion represents items stacked depth-wise. Horizontal movement detection is done by subtracting of cropped portion from respective cropped portion from reference image and second subtraction of cropped portion from reference image from respective cropped portion from the test image. After these two subtractions image can be verified for a horizontal shift. Horizontal shift of objects within box, is normal in transit and still spatial orientation of imaging of pattern with respect to vertical axis does not get changed and objects can be counted and their originality attested as well.

In one specific application, the content verification method can be employed to count the items inside a consignment without opening the consignment. In this embodiment, each of the labels applied to various items within the consignment may comprise identical layering of radio-opaque material but spatial orientation of internal identical layering in each of label differs and auto-acquired during application.

In an alternate embodiment, each of the reference image and the test image may count the number of images created by the radio opaque materials in each consignment. However, to rule out the possibility of significant overlap of the images created by the radio opaque materials of the multiple labels, multiple reference images can be obtained with different set of image capturing parameters.

In one exemplary embodiment, the image capturing parameters can be varied by varying the angle of image capture. Accordingly, the count conflict (deficiency due to exact overlap of patterns in direction of X-ray beam) can be resolved by employing angular x-ray which is achieved by rotating the consignment at a prescribed angle on the conveyor belt of x-ray machine. In angular x-ray hidden pattern gets exposed.

Figure 8A:
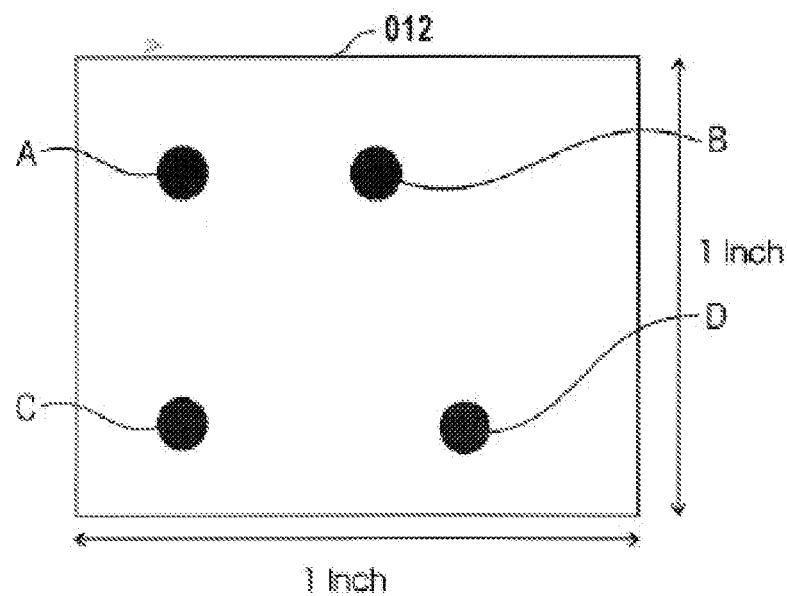
FIGS. 8a and 8b illustrate a first and second reference images of a consignment comprising five objects, in accordance with an embodiment.
Figure 8B:
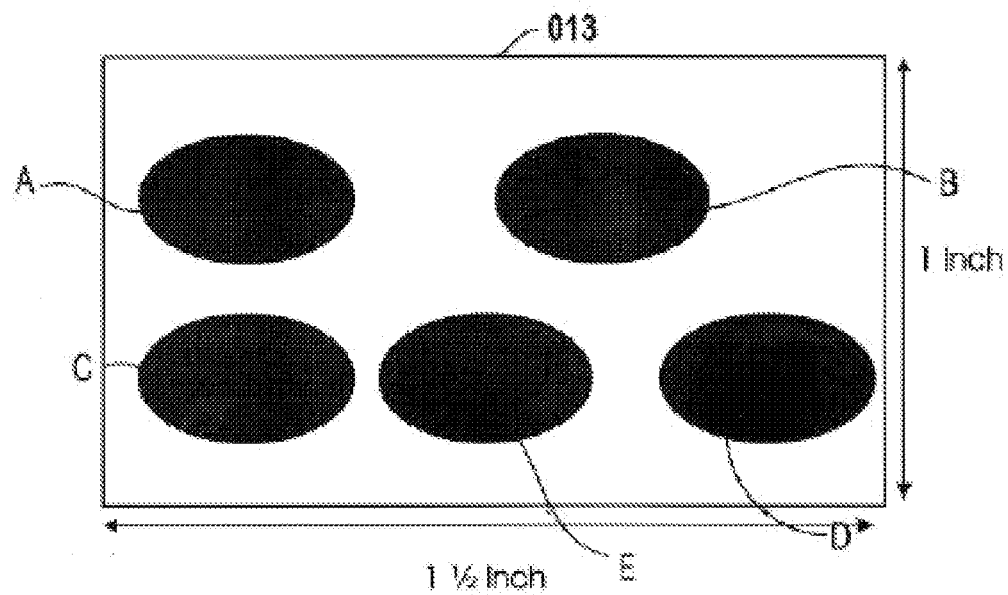

With reference to FIGS. 8a and 8b, considering there are five items stacked depth-wise, FIG. 8a (012) shows images of only four labels as one pattern is hidden due to overlap. Subsequent to the rotation of the consignment the fifth label gets exposed (013) in angular x-ray, as shown in diagram 8b. It is shown that an area of 1 inch×1 inch is cropped from full consignment imaging, which represents imaging of five items stack depth-wise at given row and column. In angular x-ray an elongated area 1 inch×1.5 inch is cropped, wherein hidden pattern 'E' is exposed and this information is digitally recorded during reference image itself and can be verified with the test image.

In another embodiment, count of partially overlapped circular pattern in x-ray imaging is described. This method is only applicable to circular patterns that are partially overlapped. This method exploits the fact that as circle is traversed along its circumference, then aggregated value of absolute difference (whether positive or negative) of both x-coordinate and y-coordinate between two equidistant points on circumference remains same. If two or more circles are partially overlapping then the periphery will not be geometrically circular and in that case aggregated value of absolute difference of x-coordinate and y-coordinate will not remain same for same distance parsed along the edge of overlapped pattern. Each time the aggregated value of absolute differences in x-coordinate and y-coordinate changes, the count of overlapped pattern is increased, and this traversal continues till original start point on periphery of pattern is reached.

Figure 13:
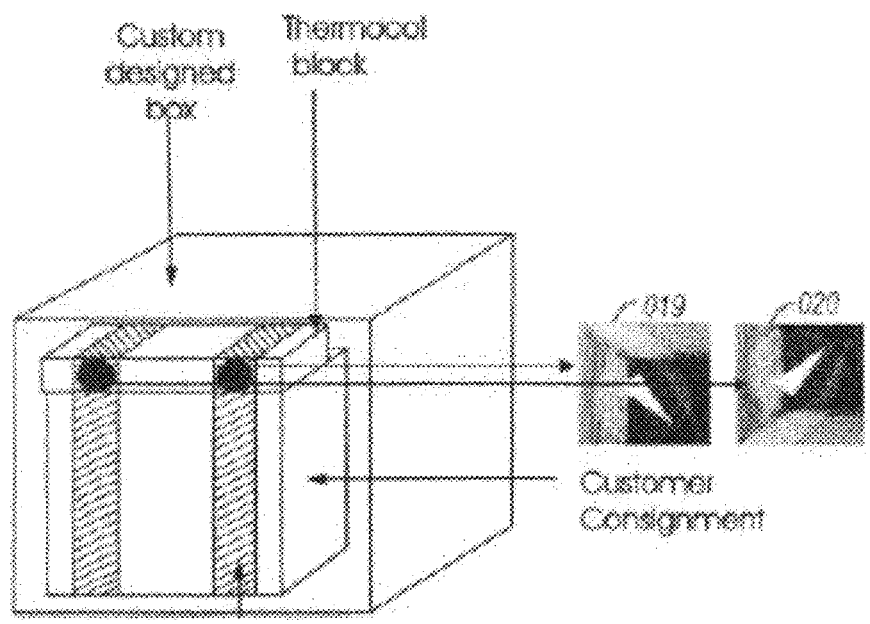
FIG. 13 illustrates x-ray imaging of box padded with thermocol like material block to ensure radio-transparent media in path of x-ray beam with two circular labels under plastic strapping, such that, any pilferage requires tampering with strapping and results in change in spatial orientation of labels (019) and (020), in accordance with an embodiment.

In alternate embodiment of content verification, full box can be strapped and labels placed under tight strapping. For any intrusion to be made, the strapping will be cut and spatial orientation of labels (019) and (020) will get changed as shown in FIG. 13. If box contains metallic items then labels can be placed along with radio transparent material block, such as, thermocol, in the direction of X-ray beam to get imaging of spatial orientation.

One theoretical threat applicable to both embodiments described, is that insider can use same imaging device to acquire the imaging of invisible patterns in one embodiment or radio-opaque pattern in another embodiment to replicate the credential. This particular threat can be taken care by reference imaging to be acquired by imaging device by varying heights (or distance from object), heuristically, such that, while spatial orientation remains same, distance and dimensions of geometric pattern will get changed. This additional data of height (or distance) will also be uploaded and indexed in database with unique identification number of object. During every subsequent scanning, imaging device will auto-adjust its height (or distance from object) to acquire imaging. Insider has no idea that reference image was taken from what height (or distance from object) and thus he will not be able to replicate by just taking the imaging even after having access to identical imaging device.

In embodiment of tamper detection, if label is used to seal opening edge of box it can so happen that intrusion is done by doing a centre line cut without disturbing the spatial orientation. Though line cut is detected by scanner by sometime fine line cut in bad lighting condition may not be detected. In such cases a thin metallic (or any hard material) thin disc is first applied symmetrically along the opening edge and then the label (which is bigger diameter than disc) is applied on top. As result any centre line cut will have to cut-through the disc and this will either make line-cut very evident or damage the label itself and thus intrusion is detected.

The advantages of the embodiments described above include 360 degree accountability, verifiability and auditability for users, auto-acquisition of credential exactly at time of application, inability to scan in isolation prevents decoupling the label from the associated item and thereby avoiding generation of false impression of asset integrity. Further, the labels described herein can be associated with information tags such as barcode and RFID that can be printed (or integrated) on labels that facilitates tracking of the associated item. The methods of tamper detection and content verification described herein provide tangible evidence and hence are legally admissible.

In an embodiment, a system that can include one or more elements discussed in the foregoing description is provided to enable verification of objects or consignments. A person skilled in the art can understand the configuration of the system in light of the foregoing description.

In various embodiments, a label, method and system for verifying objects are described. However, the embodiments are not limited and may be implemented in connection with different applications. The application can be extended to other areas, for example authenticating methods. The embodiments provide a broad concept of using a label that auto acquires its credentials at the time of application, which can be adapted in a similar verification system. The design can be carried further and implemented in various forms and specifications.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system to enable verification of an object, the system comprising:
    a security label configured to be affixed to the object and that includes:
        a scannable region configured to enable determination of a spatial orientation of the scannable region with respect to a reference point external to the security label, wherein the scannable region includes at least one pattern, and
    wherein a change in the spatial orientation is indicative of tampering due to a removal of the security label from the object, reorientation of the security label on the object, replacement of the object, change in position of the object, or replacement of the security label on the object with another security label.

2. The system of claim 1, wherein the at least one pattern includes at least one imprinted pattern of a particular color and is disposed between a first layer of the security label with a first color different from the particular color and a second layer of the security label with a second color different from the particular and first colors, such that the at least one imprinted pattern is invisible but becomes scannable by use of a machine with a specific illumination.

3. The system of claim 1, wherein the at least one pattern includes at least one invisible imprinted pattern.

4. The system of claim 3, wherein the security label has a circular shape.

5. The system of claim 3, wherein the change in the spatial orientation that is indicative tampering includes being indicative of counterfeiting.

6. The system of claim 3, further comprising:
    a storage device configured to store a reference image that represents the spatial orientation;
    an imager device configured to obtain a subsequent image that represents the spatial orientation; and
    a monitor unit communicatively coupled to the storage device and the imager device, and configured to compare the obtained subsequent image with the reference image to determine whether the spatial orientation has changed, wherein the change in the spatial orientation is represented by a mismatch between the reference image and the subsequent image.

7. The system of claim 3, wherein to be affixed to the object, the security label is configured to be affixed to a packaging of the object.

8. The system of claim 1, wherein the at least one pattern includes at least one imprinted pattern that includes radio-opaque material disposed between multiple layers of the security label.

9. The system of claim 1, wherein the security label is visually symmetrical with respect to an orientation on a surface of the object on which the label is affixed.

10. The system of claim 1, wherein the reference point external to the security label includes a reference point located on the object.

11. The system of claim 1, wherein the reference point external to the security label includes a reference point located at a scannable region of another security label affixed to the object.

12. A system to enable verification of an object, the system comprising:
    a storage device configured to store a reference image that represents a first spatial orientation, wherein the first spatial orientation is based on a spatial relationship between a pattern of a security label affixed to an object and a reference point on the object external to the security label; and
    a monitor unit communicatively coupled to the storage device, and configured to compare a subsequent image with the reference image to determine whether the first spatial orientation has changed, wherein the change in the spatial orientation is represented by a mismatch between the reference image and the subsequent image,
    wherein a change in the spatial orientation is indicative of tampering due to a removal of the security label from the object, reorientation of the security label on the object, replacement of the object, change in position of the object, or replacement of the security label on the object with another security label.

13. The system of claim 12, further comprising an imager device communicatively coupled to the monitor unit and configured to obtain the subsequent image and to provide the subsequent image to the monitor unit, wherein the subsequent image represents a second spatial orientation, wherein the second spatial orientation is based on a spatial relationship that involves the reference point on the object external to the security label, and wherein the monitor unit is configured to determine that the first spatial orientation has changed if there is a mismatch between the first and second spatial orientations.

14. The system of claim 12, wherein the monitor unit is configured to verify the object in response to a match between the reference image and the subsequent image, and configured to fail verification of the object in response to the mismatch between the reference image and the subsequent image.

15. The system of claim 12, wherein the spatial relationship between the pattern of the security label and the reference point on the object external to the security label includes a spatial relationship between the pattern of the security label and a pattern of another security label affixed to the object.

16. A method to enable verification of an object, the method comprising:
   scanning a security label affixed to the object to obtain a first spatial orientation, wherein the first spatial orientation is based on a spatial relationship between the pattern and a reference point on the object external to the security label;
   determining a second spatial orientation, wherein the second spatial orientation is based on a spatial relationship that involves the reference point on the object external to the security label;
   verifying the object in response to a match between the first and second spatial orientations; and
   failing verification of the object in response to a mismatch between the first and second spatial orientations, the mismatch being due to a removal of the security label from the object, reorientation of the security label on the object, replacement of the object, change in position of the object, or replacement of the security label on the object with another security label.

17. The method of claim 16, wherein scanning the security label to obtain the first spatial orientation includes scanning the security label to obtain a spatial relationship between the pattern and a pattern of another security label affixed to the object.

18. The method of claim 16, further comprising:
   storing, in a storage device, a first image that represents the first spatial orientation;
   generating a second image that represents the second spatial orientation; and
   comparing the generated second image with the stored first image to determine whether there is a match between the stored first image and the generated second image, wherein verification of the object occurs in response to a match between the stored first image and the generated second image, and wherein failure of verification of the object occurs in response to a mismatch between the stored first image and the generated second image.

19. A security label usable with the method of claim 16.

\* \* \* \* \*